United States Patent
Wang

(10) Patent No.: US 9,975,020 B2
(45) Date of Patent: May 22, 2018

(54) FOLDING GOLF CART

(71) Applicant: Jonathan Wang, Hayward, CA (US)

(72) Inventor: Jonathan Wang, Hayward, CA (US)

(*) Notice: Subject to any disclaimer, the term of this patent is extended or adjusted under 35 U.S.C. 154(b) by 0 days. days.

(21) Appl. No.: 15/589,007

(22) Filed: May 8, 2017

(65) Prior Publication Data

US 2018/0008873 A1 Jan. 11, 2018

(30) Foreign Application Priority Data

Jul. 6, 2016 (CN) .................... 2016 2 0708773 U

(51) Int. Cl.
*B62B 3/12* (2006.01)
*B62B 3/02* (2006.01)
*A63B 55/60* (2015.01)
*B62B 5/06* (2006.01)

(52) U.S. Cl.
CPC ............... *A63B 55/60* (2015.10); *B62B 3/02* (2013.01); *B62B 3/12* (2013.01); *B62B 5/06* (2013.01); *B62B 2202/404* (2013.01); *B62B 2205/20* (2013.01)

(58) Field of Classification Search
CPC . B62B 2202/404; B62B 3/12; B62B 2205/20; B62B 3/02; B62B 7/068; A63B 55/60; A63B 2210/50; A63B 2102/32; A63B 55/00
See application file for complete search history.

(56) References Cited

U.S. PATENT DOCUMENTS

| 7,128,333 B2 * | 10/2006 | Reimers | ................. B62B 1/045 |
| | | | 280/651 |
| 8,393,633 B2 * | 3/2013 | Liao | ........................ B62B 3/02 |
| | | | 280/42 |
| 2005/0173895 A1 * | 8/2005 | Lin | .......................... B62B 3/12 |
| | | | 280/651 |

* cited by examiner

*Primary Examiner* — Bryan A Evans
(74) *Attorney, Agent, or Firm* — Maier & Maier, PLLC

(57) ABSTRACT

A folding golf cart including a chassis, a main rod, a handle, a handle-connected seat body, a front wheel, two rear wheels, and two sets of foldable rear wheel frames. The chassis includes two chassis rods, a front-connected seat body, and a rear-connected seat body. The front ends of the two chassis rods are fixed to the front-connected seat body. The rear ends of the two chassis rods are fixed to the rear-connected seat body. The handle is rotationally connected to the handle-connected seat body. The bottom part of the main rod is hinged to the rear-connected seat body. The two rear wheels are respectively connected to the sides of the rear-connected seat body through the foldable rear wheel frames. The middle part of the front-connected seat body is connected to the front wheel through a front wheel retraction and extension device.

8 Claims, 2 Drawing Sheets

FOLDING GOLF CART

RELATED APPLICATIONS

This application claims priority under 35 U.S.C. §119 to Chinese Patent Application No. 201620708773.X filed Jul. 6, 2016, the disclosure of which is incorporated by reference herein in its entirety.

TECHNICAL FIELD

The utility model relates to the technical field of golf carts, particularly foldable golf carts.

BACKGROUND

The primary requirement of a golf cart is a frame that is sufficiently large for carrying golf bags of different sizes. The upper part and the lower part of the golf bag are usually supported by the upper and lower bag brackets on the cart, which requires a greater distance between the upper and the lower bag brackets and makes it difficult to store or transport the golf cart. The existing foldable golf cart mainly consists of a chassis, a main rod, a handle, a front wheel assembly, and a rear wheel assembly. Due to the general structure of the chassis' single round pipe, wherein the front wheel assembly is installed on the front end of the round pipe such that the front wheel cannot be retracted into the chassis, the cart occupies a relatively large volume and is rather difficult to fold. The front wheel assembly, mounted on a chassis having a single round pipe, has an unstable structure, affecting the steering flexibility of the front wheel.

SUMMARY

According to an exemplary embodiment, a foldable golf cart may have a chassis with two parallel chassis rods, a front-connected seat body, and a rear-connected seat body, wherein the front ends of the two chassis rods are fixed to the front-connected seat body and the rear ends of the two chassis rods are fixed to the rear-connected seat body. The foldable golf cart may further have a main rod, wherein the bottom part of the main rod is hinged to the rear-connected seat body. A handle may be rotationally connected to a handle-connected seat body, wherein the handle-connected seat body is fixed to the top of the main rod. A front wheel may be provided, wherein a middle part of the front-connected seat body is connected to the front wheel through a front wheel retraction and extension device. Two rear wheels may be respectively connected to sides of the rear-connected seat body through two sets of foldable rear wheel frames.

BRIEF DESCRIPTION OF THE FIGURES

Advantages of embodiments of the present invention will be apparent from the following detailed description of the exemplary embodiments thereof, which description should be considered in conjunction with the accompanying drawings in which like numerals indicate like elements, in which.

DETAILED DESCRIPTION

Aspects of the invention are disclosed in the following description and related drawings directed to specific embodiments of the invention. Alternate embodiments may be devised without departing from the spirit or the scope of the invention. Additionally, well-known elements of exemplary embodiments of the invention will not be described in detail or will be omitted so as not to obscure the relevant details of the invention. Further, to facilitate an understanding of the description discussion of several terms used herein follows.

As used herein, the word "exemplary" means "serving as an example, instance or illustration." The embodiments described herein are not limiting, but rather are exemplary only. It should be understood that the described embodiments are not necessarily to be construed as preferred or advantageous over other embodiments. Moreover, the terms "embodiments of the invention", "embodiments" or "invention" do not require that all embodiments of the invention include the discussed feature, advantage or mode of operation.

Figure 1:
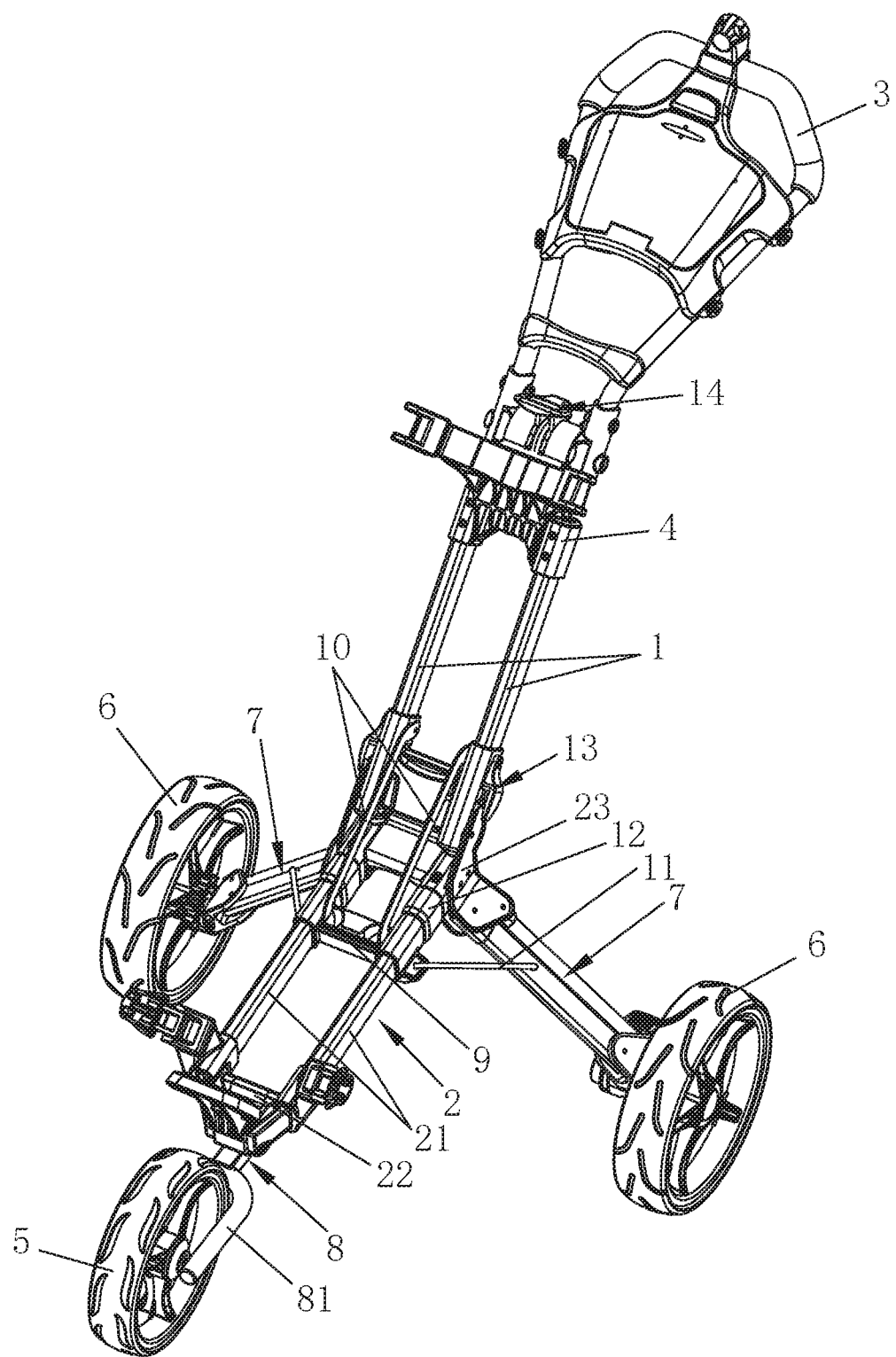
FIG. 1 is the structural diagram of the utility model.
Figure 2:
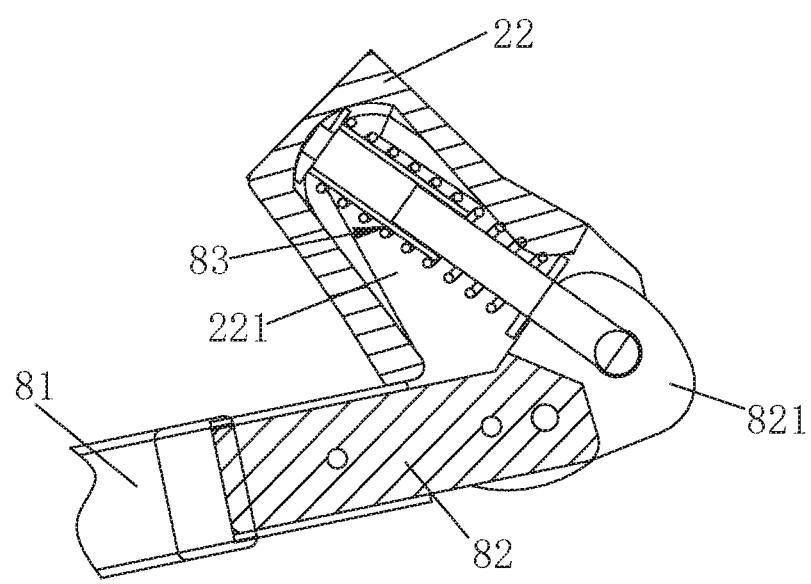
FIG. 2 is the structural diagram of the utility model's front wheel retraction and extension device.

Referring generally to FIGS. 1-2, in an exemplary embodiment, the folding golf cart may include a chassis 2, a main rod 1, a handle 3, a handle-connected seat body 4 fixed to the top of the main rod 1, a front wheel 5, two rear wheels 6, and two sets of foldable rear wheel frames 7. The chassis 2 may include two parallel chassis rods 21, a front-connected seat body 22, and a rear-connected seat body 23. The front ends of the two chassis rods 21 may be fixed to the front-connected seat body 22. The rear ends of the two chassis rods 21 may be fixed to the rear-connected seat body 23. The handle 3 may be rotationally connected to the handle-connected seat body 4. The bottom part of the main rod 1 may be hinged to the rear-connected seat body 23. The two rear wheels 6 may be respectively connected to the sides of the rear-connected seat body 23 through the foldable rear wheel frames 7. The middle part of the front-connected seat body 22 may be connected to the front wheel 5 through a front wheel retraction and extension device 8.

The front wheel retraction and extension device 8 may include a front fork 81, a rotating seat 82 fixed to the rear end of the front fork 81, and a spring jack mechanism 83 for locking the rotating seat 82 in the extended or retracted position. The bottom part of the front-connected seat body 22 may be fitted with a holding slot 221. The part of the rotating seat 82 close to the rear end may be hinged at both sides of the holding slot 221. The rear end of the rotating seat 82 may be fitted with a cam part 821. The swing jack mechanism 83 may be connected between the holding slot 221 and the cam part 821. The spring jack mechanism 83 may be a spring. When the front fork 81 is in the retracted or extended position, the front fork 81 may tend to rotate downwards under the gravitational effects of the front wheel 5, the front fork 81, and the rotating seat 82, whereas the spring jack mechanism 83 may lift the cam part 821 of the rotating seat 82 to generate an upward rotation and offset the gravitational effects of the front wheel 5, the front fork 81, and the rotating seat 82, so as to lock the front fork 81 in the retracted or extended position. Appropriate force exerted by the hands can extend or retract the front fork 81. The front fork 81 can rotate 180° for easy retraction or extension, convenient operation, saved time and energy, a substantially smaller folded volume, saved space, and convenient storage and transportation.

The main rod 1 may be connected to the two sets of foldable rear wheel frames 7 through a linkage mechanism, The linkage mechanism may include an interlocked sliding seat 9, a first linkage rod 10, and two second linkage rods 11. The interlocked sliding seat 9 may be sheathed on the two chassis rods 21. Both ends of the first linkage rod 10 may be respectively hinged to the main rod 1 and the interlocked sliding seat 9. The first ends of the two second linkage rods 11 may be respectively connected to one set of foldable rear wheel frames 7. The second ends of the two second linkage rods 11 may be respectively hinged to the interlocked sliding seat 9. As the main rod 1 is retracted, the linkage mechanism may cause the two sets of foldable rear wheel frames 7 to retract, making retraction more convenient.

The part of the chassis rod 21 close to the rear end may be fitted with a protective casing 12. The protective casing 12 may be fitted between the rear-connected seat body 23 and the interlocked sliding seat 9. The protective casing 12 can prevent the hands from being caught. A spring can be placed in the protective casing 12 to provide the forward thrust for the interlocked sliding seat 9, for easier and less labor-intensive retraction.

The foldable rear wheel frames 7 may include a parallel four-bar structure. There may be two main rods 1, which may be arranged in parallel for a more stable structure. A frame-locking device 13 may be placed between each main rod 1 and the rear-connected seat body 23 to connect them, and a handle-locking device 14 may be placed between the handle 3 and the handle-connected seat body 4 to connect them, which may help to unlock and fix the utility model in the extended position.

The structure of the chassis 2 of the utility model may include two chassis rods 21, which may make the utility model more stable and easier to fold. After the front wheel is installed on the chassis 2, the utility model may be more stable, with more flexible front wheel steering. The front wheel can be retracted between the two chassis rods 21. The front wheel can be retracted into the chassis 2 for a smaller folding volume.

The foregoing description and accompanying figures illustrate the principles, preferred embodiments and modes of operation of the invention. However, the invention should not be construed as being limited to the particular embodiments discussed above. Additional variations of the embodiments discussed above will be appreciated by those skilled in the art (for example, features associated with certain configurations of the invention may instead be associated with any other configurations of the invention, as desired).

Therefore, the above-described embodiments should be regarded as illustrative rather than restrictive. Accordingly, it should be appreciated that variations to those embodiments can be made by those skilled in the art without departing from the scope of the invention as defined by the following claims.

What is claimed is:

1. A foldable golf cart comprising:
   a chassis with two parallel chassis rods, a front-connected seat body, and a rear-connected seat body, wherein front ends of the two chassis rods are fixed to the front-connected seat body and the rear ends of the two chassis rods are fixed to the rear-connected seat body;
   at least one main rod, wherein a bottom part of the at least one main rod is hinged to the rear-connected seat body;
   a handle rotationally connected to a handle-connected seat body, wherein the handle-connected seat body is fixed to a top of the at least one main rod;
   a front wheel, wherein a middle part of the front-connected seat body is connected to the front wheel through a front wheel retraction and extension device;
   two rear wheels respectively connected to sides of the rear-connected seat body through two sets of foldable rear wheel frames.

2. The foldable golf cart of claim 1, wherein the front wheel retraction and extension device includes a front fork, a rotating seat fixed to a rear end of the front fork, and a spring jack mechanism for locking the rotating seat in an extended or retracted position; and
   wherein a bottom part of the front-connected seat body is fitted with a holding slot, a part of the rotating seat proximate to the rear end of the front fork is hinged at both sides of the holding slot, a rear end of the rotating seat is fitted with a cam part, and the spring jack mechanism is connected between the holding slot and the cam part.

3. The foldable golf cart of claim 1, further comprising:
   a linkage mechanism connecting the at least one main rod to the two sets of foldable rear wheel frames, wherein the linkage mechanism includes an interlocked sliding seat sheathed on the two chassis rods, a first linkage rod, and two second linkage rods,
   wherein both ends of the first linkage rod are respectively hinged to the at least one main rod and the interlocked sliding seat, and
   wherein first ends of the two second linkage rods are respectively connected to one set of foldable rear wheel frames and second ends of the two second linkage rods are respectively hinged to the interlocked sliding seat.

4. The foldable golf cart of claim 3, further comprising:
   a protective casing fitted to a part of the chassis rod proximate to a rear end between the rear-connected seat body and the interlocked sliding seat.

5. The foldable golf cart of claim 1, wherein the foldable rear wheel frames include a parallel four-bar structure.

6. The foldable golf cart of claim 1, further comprising two main rods arranged in parallel.

7. The foldable golf cart of claim 6, further comprising:
   a frame-locking device placed between and connecting each main rod and the rear-connected seat body.

8. The foldable golf cart of claim 1, further comprising:
   a handle-locking device placed between and connecting the handle and the handle-connected seat body.

* * * * *